United States Patent [19]

Schoettler

[11] Patent Number: 4,852,256

[45] Date of Patent: Aug. 1, 1989

[54] DEVICE FOR CUTTING MUSHROOMS INTO SLICES

[75] Inventor: Hans Schoettler, Herscheid, Fed. Rep. of Germany

[73] Assignee: Westmark Schulte & Co. KG, Herscheid, Fed. Rep. of Germany

[21] Appl. No.: 130,639

[22] Filed: Dec. 9, 1987

[30] Foreign Application Priority Data

Dec. 13, 1986 [DE] Fed. Rep. of Germany ....... 3642697

[51] Int. Cl.$^4$ .................................................. A21C 5/08

[52] U.S. Cl. .......................................... 30/114; 99/537

[58] Field of Search ................. 30/114, 120.3; 99/537, 99/538, 545

[56] References Cited

U.S. PATENT DOCUMENTS

| | | | |
|---|---|---|---|
| 767,386 | 8/1904 | Canclini . | |
| 2,166,624 | 7/1939 | Cohn et al. . | |
| 2,254,738 | 9/1941 | Gamache . | |
| 2,990,863 | 7/1961 | Pantermoller | 99/537 X |
| 3,116,770 | 1/1964 | Tanuma | 30/114 |
| 4,557,053 | 12/1985 | Hadley, Jr. . | |
| 4,582,265 | 4/1986 | Petronelli | 30/120.3 |

FOREIGN PATENT DOCUMENTS 8503899 9/1985 European Pat. Off. .

*Primary Examiner*—Frank T. Yost
*Assistant Examiner*—Willmon Fridie, Jr.
*Attorney, Agent, or Firm*—Antonelli, Terry & Wands

[57] ABSTRACT

A device for cutting, for example, mushrooms, and, especially, champignons, including two pincer arms articulated together at rear ends thereof, with the cutting device being adapted to be held in one hand of the user, and with the arm being compressible against a return spring. One pincer arm includes a cutting grid at a forward end thereof, with the cutting grid being aligned with the receiving depression for receiving the mushroom and disposed on the other pincer arm. The receiving depression includes a round trough shape which is constructed to receive a mushroom such as a champignon on a cap side thereof. The cutting grid includes sharpened stainless steel blades and both of the pincer arms include handle projections extending forwardly beyond the cutting grid and receiving depression, by which the pincer arms are grippable and compressible by the other hand of the user of the cutting device.

8 Claims, 2 Drawing Sheets

DEVICE FOR CUTTING MUSHROOMS INTO SLICES

BACKGROUND OF THE INVENTION

The present invention relates to a cutting device and, more particularly, to a device for cutting mushrooms, especially champignons, into slices.

Mushrooms are almost exclusively cut into slices by use of a kitchen knife but the geometrically complex shape, the inhomogeneous toughness distribution, and the fragility of the mushroom call for a high degree of skill if smooth mushroom slices are to be produced. While it is true that many cutters have been proposed which include two pincers arms articulated together at their end or rear portions thereof, with the cutters being constructed to be held in one hand and compressed against a return spring, with one pincer arm having, at a forward end thereof a cutting grid aligned with a receiving depression at the other pincer arm, these proposed devices are suitable for cutting, for example, hard-boiled eggs, boiled jacketed potatoes, beets and similar foods. However, attempts to cut fresh champignons with these proposed devices produce only very irregularly shaped slices whose edges have many tears or frayed places, and frequently the slices break up into several pieces because the mushroom is squeezed or pressed too hard during a cutting operation.

It has also been proposed, in order to obtain better results, to use a cutter with a flat support for the food to be cut and, mushrooms, when cut along the axis, are placed on the flat support or holder with their smooth cut surfaces against it, with the mushroom halves then being cut into groups of slices by the cutting grid. However, this produces only mushroom slices cut in half which is generally undesirable.

The aim underlying the present invention essentially resides in providing a device for cutting mushrooms, especially champignons, into smooth slices with a complete shape of the mushroom, which device is utilizable for mushrooms of considerably different sizes.

In accordance with the present invention, the cutting device includes two pincer arms articulated together at the rear end portions thereof, with the cutting device being adapted to be held in one hand and to be compressible against a turn spring, and with one of the pincer arms having at a forward end thereof a cutting grid aligned with a receiving depression on the other arm. The receiving depression includes a round, trough-shaped construction suitable to accommodate a champignon resting on its cap and the cutting grid is composed of sharpened stainless steel blades, wherein both pincer arms have gripping projections or handles extending forwardly beyond the cutting grid and receiving depression so as to enable the arms to be gripped or grasped and compressed by the other hand of the user of the cutting device.

By virtue of the features of the present invention, it is possible to apply the cutting pressures with both hands thereby permitting a very delicate touch and also allowing relatively tough mushrooms to be cut.

According to the present invention, the mushroom is sliced while resting on its cap so that the cutting grid first cuts the stalk of the mushroom which has a relatively high degree of toughness. In this connection, in order to prevent the mushroom from being crushed or broken the cap of the mushroom must rest fully on the bottom of the receiving depression in a central area thereof, so that, preferably, in accordance with the present invention, the receiving depression is a bottom which is only slightly concave and extends over more than two-thirds of the diameter of the receiving depression opening, and has steep edges adjacent thereto. The sides and flare of the trough-shaped receiving depression is selected to match the largest commercial champignons, so that the largest as well as the smaller mushrooms will have a reliable support in a central cap area thereof.

According to the present invention, in a first portion of the cut, in which the stem of the mushroom is cut, only a few blades are used and, preferably, the cutter has an odd number of blades such as, for example, seven blades spaced approximately 5.5 mm apart. Since the mushrooms are normally placed centrally in the receiving depression, stems less than 11–12 mm in diameter will be cut only by a single blade so that even small mushrooms will yield unbroken slices with the complete shape of the mushroom.

As the cutting process proceeds, the blades pass through the soft underside into the cap of the mushroom whereupon the cap, depending on the toughness thereof, is squeezed more or less firmly against the bottom of the receiving depression until the blades slice through the skin. To prevent mushroom slices from fraying at their edges in the cap area, according to further features of the present invention, the blade receiving grooves in the depression area are constructed so as to be narrower than the mushroom support bars located therebetween, each of which has a broad upper side that matches the contour of the receiving depression. The grooves are generally substantially V-shaped in cross-sectional configuration, with the side walls of the grooves all lying in the same plane. Consequently, the grooves in the central area of the receiving depression are very narrow while, at their edges, they are wide enough to be easily cleaned.

The cut mushroom slices must then be placed in a pan or other container in which they should lie individually, that is, the mushroom slices should no longer stick together. According to further provisions of the present invention, the cutting blades, when the frame of the cutting grid strikes a limiting stop, sink into the grooves, while the rear or back portion of the blades are still disposed between the cut slices of mushrooms. Consequently, the slices of the mushroom are still held by the cutting blades after the cutting operation and, by tipping out the cutter like a spoon, the mushroom slices can be dropped directly into the pan or the like, whereupon a cluster of mushroom slices fall apart and the mushroom slices can drop individually into the pan or other container.

By virtue of the provision of the limiting stop of the present invention, it is ensured that the cutter blades themselves do not strike the walls of the receiving depression, which prevents the blades from becoming prematurely dull. It has been experimentally determined that using very sharp blades for this application is extremely important.

In accordance with still further features of the present invention, provision is made for the cutting blade frame to have a round frame portion which fits around the receiving depression when the cutting device is closed, with the cutting blades having one end fastened to the rear curved area of the blade frame in such a manner that the cutting blades have forward ends thereof fastened to an underside of the handle projection which is approximately the same width as the cutting grid. A curved bead is advantageously formed on the underside of the handle projection and is approximately parallel to the rear curved area in which the forward ends of the cutting blades rest and which is aligned with the matching stop on the upper side of the handle projection of the other pincer arm. By virtue of such a construction, the cutting blades may be of the same length thereby resulting in a considerable reduction in manufacturing costs.

It is also possible in accordance with the present invention to fashion the receiving depression into a frustroconical bottom piece which has a larger base on a substantially straight pincer arm. By virtue of such a construction, the cutting device may be placed on a table or other supporting structure with the arm holding the receiving depression on the table and also used as an appliance on the table thereby permitting especially tough foods to be cut or sliced.

The above and other objects, features, and advantages of the present invention will become more apparent from the following description when taken in connection with the accompanying drawings which show, for the purpose of illustration only, several embodiments in accordance with the present invention.

DETAILED DESCRIPTION

Figure 1:
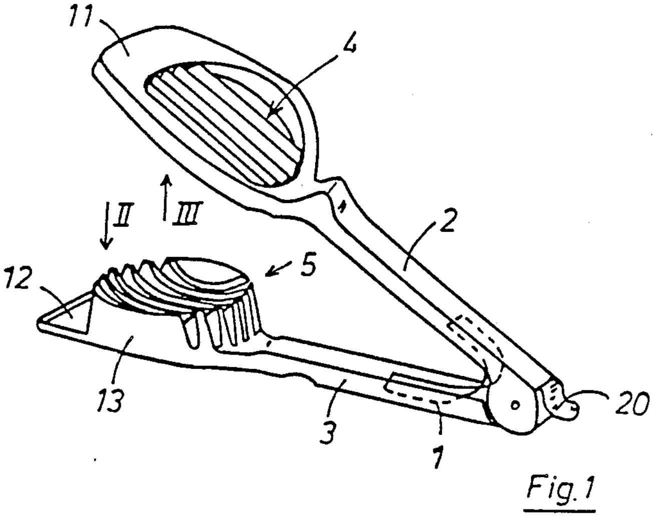
FIG. 1 is a perspective view of a mushroom cutter constructed in accordance with the present invention.

Referring now to the drawings wherein like reference numerals are used throughout the various views to designate like parts and, more particularly, to FIG. 1, according to this figure, a cutting device for cutting, for example, mushrooms such as, for example, champignons, includes two pincer arms 2, 3 articulated together at rear ends thereof and adapted to be held in one hand so as to be compressible against a return spring 1, with one of the pincer arms 2 including a cutting grid 4 at a forward end thereof, and with the cutting grid 4 being aligned with a receiving depression generally designated by the reference numeral 5 on the other pincer arm 3.

Figure 4:
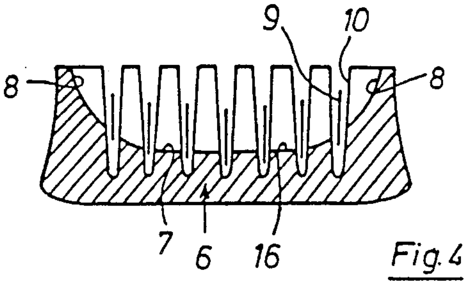
FIG. 4 is a cross-sectional view of the cutting device taken through the depression along the line IV—IV in FIG. 2.

The receiving depression 5 includes, as shown most clearly in FIG. 4, a round trough-shape 6 suitable for receiving a mushroom such as, for example, a champignon mushroom resting on its cap. Over an area which is approximately two-thirds of a diameter of the depression opening 5, a bottom 7 of the receiving depression 5 is only slightly curved and includes steep trough edges 8 only in an outer one-sixth of the diameter of the depression opening.

Figure 3:
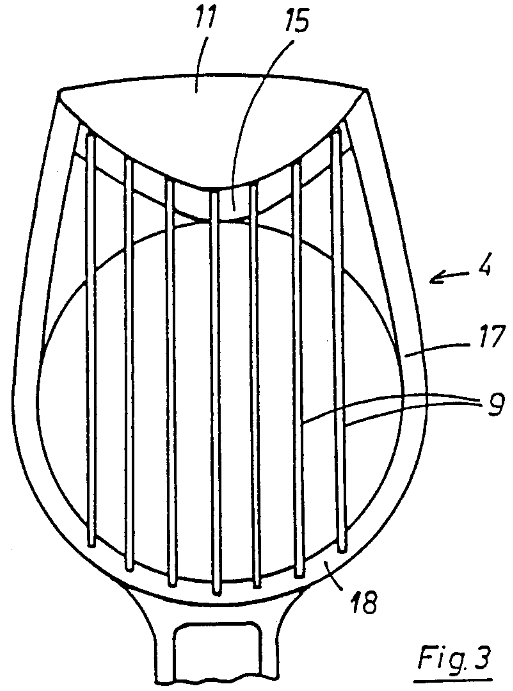
FIG. 3 is a top view of the cutting grid taken in the direction of arrow III in FIG. 1.
Figure 2:
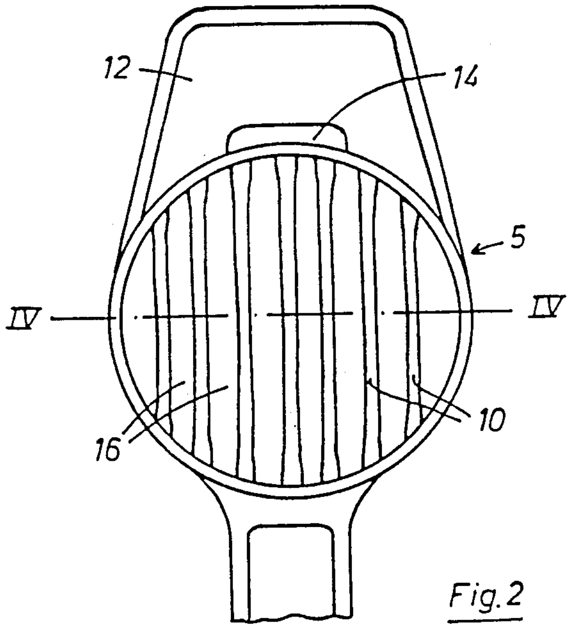
FIG. 2 is a top view of a receiving depression taken in the direction of the arrow II in FIG. 1.

The cutting grid 4, as shown most clearly in FIGS. 2 and 3 includes, for example, seven parallel stainless steel frame blades 9 aligned with seven receiving grooves 10 (FIGS. 2, 4) located in a bottom of the receiving depression 5, with the receiving grooves 10 being of a slightly V-shape in cross-sectional configuration.

Both pincer arms 2, 3 are prolonged or extended at the forward end beyond the cutting grid 4 and the receiving depression 5 and are provided with handle projections 11, 12 which are approximately the width of the cutting grid 4. In the position shown in FIG. 1, the device, for example, is gripped by the right hand in a vicinity of the pincer arms 2, 3 and operated, with the handle projections 11, 12 making it possible to exert additional cutting pressure with the other hand.

The receiving depression 5 includes, as shown in FIG. 1, a frustroconical base unit 13 with a lower larger base thereof resting on a substantially straight pincer arm 3. On a top of the forward handle projection 12, adjoining the receiving depression 5, a stop or striker 14 is provided on which a curved bead provided on the underside of the handle projection 11 on the other pincer arm strikes when the cutting grid 4 is pressed down before any of the stainless steel blades 9 strike the bottom of the grooves 10 as shown most clearly in FIG. 4 which depicts the end position of the stainless steel cutting blades 9.

As evident from FIG. 4, the receiving grooves 10 are definitely narrower in a vicinity of a bottom portion 7 than the mushroom support bars 16 located therebetween, each of which has a broad upper side which fits the contour of the receiving depression 5.

The cutting grid frame includes a round frame part 17 (FIG. 3) which fits around the receiving depression 5 when the cutting device is closed, and, to the rear curved area 18 one end of the stainless steel cutting blades 9 are fastened. The cutting grid frame also includes, on an underside of the handle projection 11, a bead 19 which is curved and extends approximately parallel to the rear curved area 18 in which the forward ends of the stainless steel blades 9 rest and which simultaneously serves in a middle area thereof as a stop 15 for the stop or striker 14. As shown in FIG. 2, all the stainless steel blades 9 are of the same length, with excess lengths of the blades being received and covered by the handle projection 11.

A hinge lock 20 (FIG. 1) of the type proposed in, for example, Auslegeschrift No. 1,177,086 may be provided on the cutting device whereby it is possible to lock the cutting device in a closed position so that the cutting device can be stored in a limited space.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A cutting device for cutting mushrooms into slices, the device comprising two pincer arms, means disposed at rear ends of the pincer arms for articulating the arms to each other enabling the cutting device to be held in one hand of a user, a return spring means interposed between the pincer arms and being adapted to enable a compression of the pincer arms against a returning force of the return spring means, a cutting grid means disposed at a forward end of one of said pincer arms, receiving depression means disposed on the other pincer arm for receiving the mushrooms and disposed in alignment with said cutting grid means, the receiving depression means having a substantially round trough shape for enabling accommodation of a mushroom resting in the receiving depression on a cap side thereof, and including a bottom portion having only a slightly curved area and extending over more than two-third of a diameter of the receiving depression means and steep edges, said cutting grid means including an odd number of sharp stainless steel cutting blade means, wherein handle means are provided at forward ends of the respective pincer arms, with the handle means projecting beyond the butting grid means and receiving depression means thereby enabling the pincer arms to be additionally grippable and compressible by the other hand of the user, and wherein limiting stop means are provided whereby the stainless steel cutting blade means upon striking a cutting grid frame, are sunk into the cutter receiving grooves of the receiving depression means while backs of the stainless steel cutting blade means are still between the cut slices.

2. A device according to claim 1, wherein the number of stainless steel cutting blade means is seven.

3. A device according to claim 1, wherein the stainless steel cutting blade means are spaced at about 5.5 mm with respect to each other.

4. A device according to claim 1, wherein the receiving depression means includes a frustroconical base element having a larger base area thereof resting on an essentially straight arm of the two pincer arms.

5. A cutting device for cutting mushrooms into slices, the device comprising two pincer arms, means disposed at rear ends of the pincer arms for articulating the arms to each other and enabling the cutting device to be held in one hand of a user, a return spring means interposed between the pincer arms and being adapted to enable a compression of the pincer arms against a returning force of the return spring means, a cutting grid means disposed at a forward end of one of said pincer arms, receiving depression means disposed on the other pincer arm for receiving the mushrooms and disposed in alignment with said cutting grid means, the receiving depression means having a substantially round trough shape for enabling accommodation of a mushroom resting in the receiving depression on a cap side thereof and including a bottom portion having only a slightly curved area and extending over more than two-thirds of a diameter of the receiving depression means and including steep edges, said cutting grid means including a plurality of sharp stainless steel cutting blade means, said handle means are provided at forward ends of the respective pincer arms, with the handle means projecting beyond the cutting grid means and receiving depression means thereby enabling the pincer arms to be additionally grippable and compressible by the other hand of the user, and wherein the receiving depression means includes cutter receiving grooves for accommodating the respective stainless steel cutting blade means each having a substantially V-shaped cross-sectional configuration and, in a vicinity of the bottom portion, having a narrower configuration than a mushroom support rod means located therebetween, each of which includes a broad upper side which lies on a contour of the trough-shape.

6. A device according to claim 5, wherein limiting stop means are provided whereby the stainless steel cutting blade means, upon striking a cutting grid frame, are sunk into the cutter receiving grooves of the receiving depression means while backs of the stainless steel cutting blade means are still between the cut slices.

7. A device according to claim 6, wherein the cutting grid means includes a round frame portion surrounding the receiving depression means when the cutting device is closed, with the stainless steel and cutting blade means each being fastened at one end in a rear curved area of the round frame portion, and wherein all of the stainless steel cutting blade means are of the same length and are fastened at forward ends thereof to an underside of the handle projecting which has approximately a same width as a width of the cutting grid means.

8. A device according to claim 7, wherein a curved bead extending approximately parallel to a rear curved area of the cutting grid frame is provided on an underside of the handle projecting in which the forward ends of the stainless steel cutting blade means rest, with the curved bead being aligned with the limiting stop means on an upper side of the handle side projection of the other pincer arm.

* * * * *